United States Patent [19]
Ebara et al.

[11] Patent Number: 4,994,900
[45] Date of Patent: Feb. 19, 1991

[54] TELEVISION RECEIVER

[75] Inventors: Masami Ebara; Hajime Mizugami, both of Osaka; Tadashi Amino, Hyogo, all of Japan

[73] Assignee: Sanyo Electric Co., Ltd., Osaka, Japan

[21] Appl. No.: 431,956

[22] Filed: Nov. 6, 1989

[30] Foreign Application Priority Data

Nov. 9, 1988 [JP] Japan ................................ 63-283225

[51] Int. Cl.$^5$ ............................................ H04N 9/78
[52] U.S. Cl. ........................................ 358/31; 358/22
[58] Field of Search .................................. 358/22, 31

[56] References Cited

U.S. PATENT DOCUMENTS 4,701,785 10/1987 Willis ..................................... 358/31
4,853,765 8/1989 Katsumata et al. .................... 358/31

FOREIGN PATENT DOCUMENTS 33144 3/1977 Japan ..................................... 358/31
61-123295 6/1986 Japan .

Primary Examiner—John W. Shepperd
Attorney, Agent, or Firm—Armstrong, Nikaido, Marmelstein, Kubovcik & Murray

[57] ABSTRACT

In normal reproduction, a switch circuit (11) is set to select an output signal of an A/D converter (1). Consequently, a movement adaptation type YC separating circuit is formed, whereby a luminance signal and a chrominance signal are separated. When a control signal is outputted from a control signal generating circuit (12) in response to an instruction of still picture reproduction, the switch circuit (11) selects an output signal of the last output terminal of delay means formed by line memory (2) or frame memory (3) and inputs the selected signal to the first input terminal of the delay means. As a result, in still picture reproduction, a circulating circuit where the inputted composite video signal circulates in the delay means is formed and a luminance signal and a chrominance signal are separated based on a plurality of composite video signals having different delay times obtained from the circulating circuit. Thus, the delay means provided in the movement adaptation type YC separating circuit is used also for processing of still picture reproduction.

6 Claims, 4 Drawing Sheets

TELEVISION RECEIVER

BACKGROUND OF THE INVENTION

1. Field of the Invention

The present invention relates generally to television receivers, and more particularly to television receivers having a still picture reproducing function.

2. Description of the Background Art

Conventional methods for separating a luminance signal (Y signal) and a chrominance signal (C signal) from a composite television signal include a method using a movement adaptation type YC separating circuit.

FIG. 1 is a block diagram showing a construction of a conventional movement adaptation type YC separating circuit disclosed in Japanese Patent Laying-Open No. 61-123295. Referring to FIG. 1, a composite video signal is converted to an 8-bit digital signal by an A/D converter 1. This digital signal is delayed by 1H (H being a horizontal sync signal period) in a line memory 2 and it is further delayed by 524H's in a frame memory 3. Input and output signals of the line memory 2 supplied to a subtracter 4, where the output signal of the line memory 2 is subtracted from the input signal of the line memory 2. A luminance signal component is offset in the output of the subtracter 4 by line correlation of the composite television signal. However, since a high frequency component of the luminance signal in the vertical direction of the screen remains, this component is removed by a horizontal bandpass filter 5. The output of the horizontal bandpass filter 5 is supplied as a first chrominance signal MC to a mixing circuit 9. The output signal of the A/D converter 1 and the first chrominance signal MC are supplied to a subtracter 6, where the first chrominance signal MC is subtracted from the output signal of the A/D converter 1. As a result, the chrominance signal component is offset in the composite television signal as the output signal of the A/D converter 1, whereby a first luminance signal MY is obtained. This first luminance signal MY is supplied to the mixing circuit 9.

In the meantime, the output signal of the A/D converter 1 and the output signal of the frame memory 3 are supplied to a subtracter 7, where the output signal of the frame memory 3 is subtracted from the output signal of the A/D converter 1. Since the output signal of the frame memory 3 is a signal delayed exactly by one frame from the composite video signal outputted from the A/D converter 1, a luminance signal component is offset in the output signal of the A/D converter 1 by frame correlation so that a second chrominance signal SC is obtained. This second chrominance signal SC is supplied to the mixing circuit 9. The output signal of the A/D converter 1 and the second chrominance signal SC are supplied to a subtracter 8, where the second chrominance signal SC is subtracted from the output signal of the A/D converter 1. As a result, the color signal component is offset in the composite video signal outputted from the A/D converter 1, whereby a second luminance signal SY is obtained. The second luminance signal SY is supplied to the mixing circuit 9.

The output signal of the A/D converter 1 and the output signal of the frame memory 3 are supplied to a movement detecting circuit 10. This movement detecting circuit 10 evaluates a difference signal between frames of the composite video signal and determines based on the difference signal whether an image formed by the present composite video signal is a moving picture or a still picture. The output of the movement detecting circuit 10 is supplied to the mixing circuit 9. The mixing circuit 9 selects the first luminance signal MY and the first chrominance signal MC separated by utilizing the line correlation and outputs those signals as the luminance signal Y and the chrominance signal C if the output of the movement detecting circuit 10 indicates a moving picture. On the other hand, if the output of the movement detecting circuit 10 indicates a still picture, the mixing circuit 9 selects the second luminance signal SY and the second chrominance signal SC separated by utilizing the frame correlation and outputs those signals as the luminance signal Y and the chrominance signal C.

The movement detecting circuit 10 may be constructed to output a detection signal having its level changing in an analog manner according to the moving condition of the picture and the mixing circuit 9 may be constructed to mix the first luminance signal MY and the second luminance signal SY with a ratio according to the level of the detection output and to mix the first chrominance signal MC and the second chrominance signal SC with that ratio.

The above mentioned movement adaptation type YC separating circuit makes it possible to separate a luminance signal and a chrominance signal with high qualities without causing any mixture or remaining of those signals.

If still picture reproduction is to be effected in a television receiver comprising a movement adaptation type YC separation circuit as described above, still picture reproduction processing is conventionally carried out by using a dedicated frame memory. More specifically, a frame memory other than the frame memory provided in the movement adaptation type YC separating circuit is provided to carry out still picture reproduction processing. However, this frame memory dedicated to still picture reproduction processing is very expensive and the use of such a dedicated frame memory is disadvantageous in cost.

SUMMARY OF THE INVENTION

An object of the present invention is to effect still picture reproduction with an inexpensive construction in a television receiver including a movement adaptation type YC separating circuit.

A television receiver according to the present invention includes luminance signal/chrominance signal separating means for separating a luminance signal and a chrominance signal from a composite video signal. This luminance signal/chrominance signal separating means includes delay means, first extracting means, second extracting means, a movement detecting circuit and a mixing circuit. The delay means includes a plurality of delay elements connected in series, which delay the composite video signal successively and output a plurality of composite video signals having different prescribed delay times. The first extracting means evaluates an input signal and/or an output signal of the delay means and extracts a first luminance signal and a second chrominance signal based on line correlation of the composite video signal. The second extracting means evaluates the input signal and/or the output signal of the delay means and extracts a second luminance signal and a second chrominance signal based on frame correlation of the composite video signal. The movement detecting circuit detects a movement of a picture. The mixing circuit controls a mixing ratio of the first and second luminance signals and a mixing ratio of the first and second chrominance signals in response to the output of the movement detecting circuit. The television receiver of the present invention further includes control signal generating means and switch means. The control signal generating means generates a control signal in response to a still picture reproduction instruction. The switch means is controlled in response to the control signal to form a circulating circuit which short-circuits the input and output terminals of the delay means in the still picture reproduction so that the composite video signal circulates in the delay means. In the still picture reproduction, the luminance signal/chrominance signal separating means separates the luminance signal and the chrominance signal based on the output obtained from the circulating circuit.

Thus, according to the present invention, processing for still picture reproduction is carried out by using the delay means included in the luminance signal/chrominance signal separating means (the movement adaptation type YC separating circuit).

According to the present invention, the delay means provided in the luminance signal/color signal separating means is also used for still picture reproduction and consequently processing for still picture reproduction can be carried out with an inexpensive construction.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
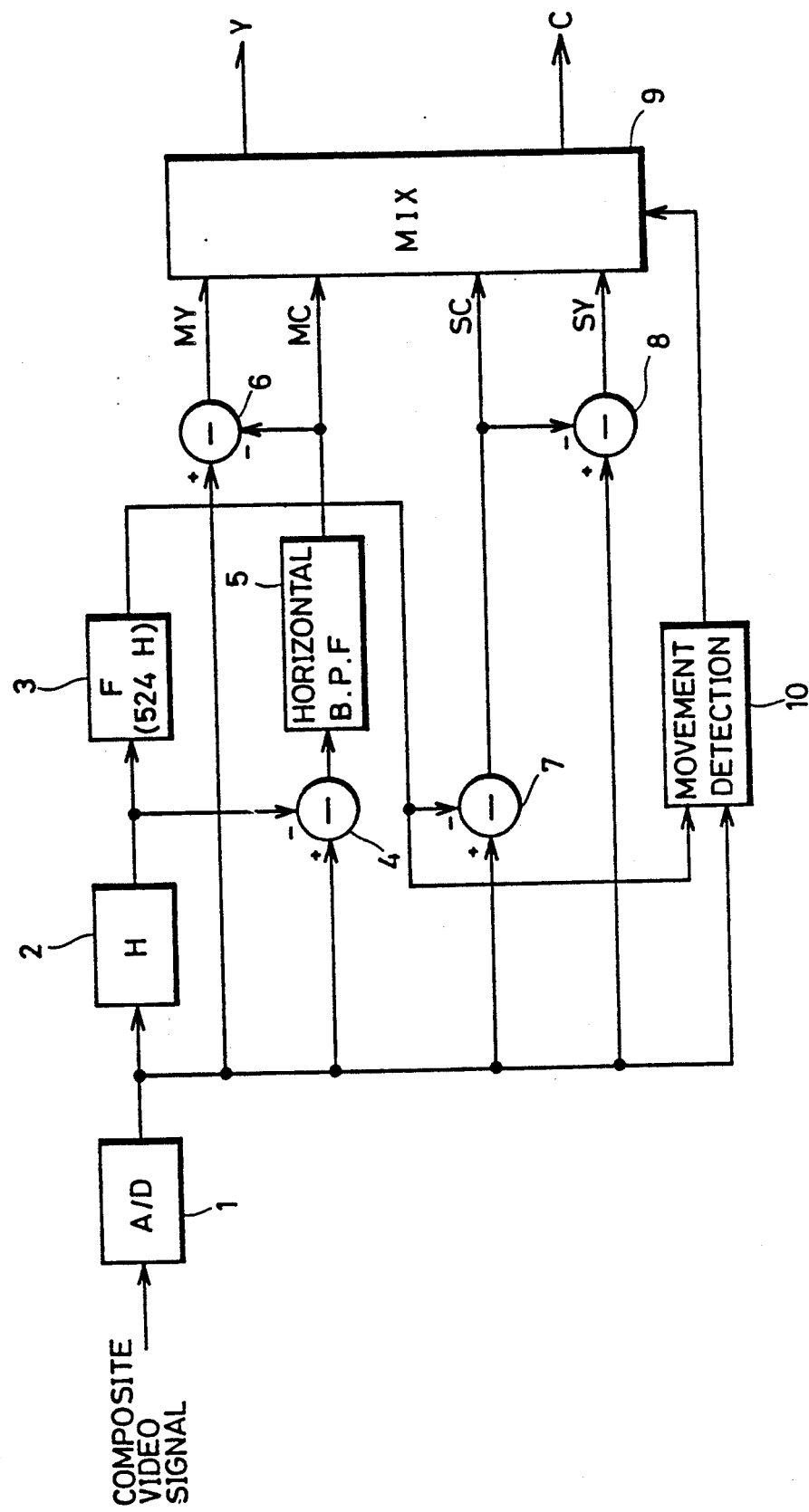
FIG. 1 is a block diagram showing a construction of a conventional movement adaptation type YC separating circuit.
Figure 2:
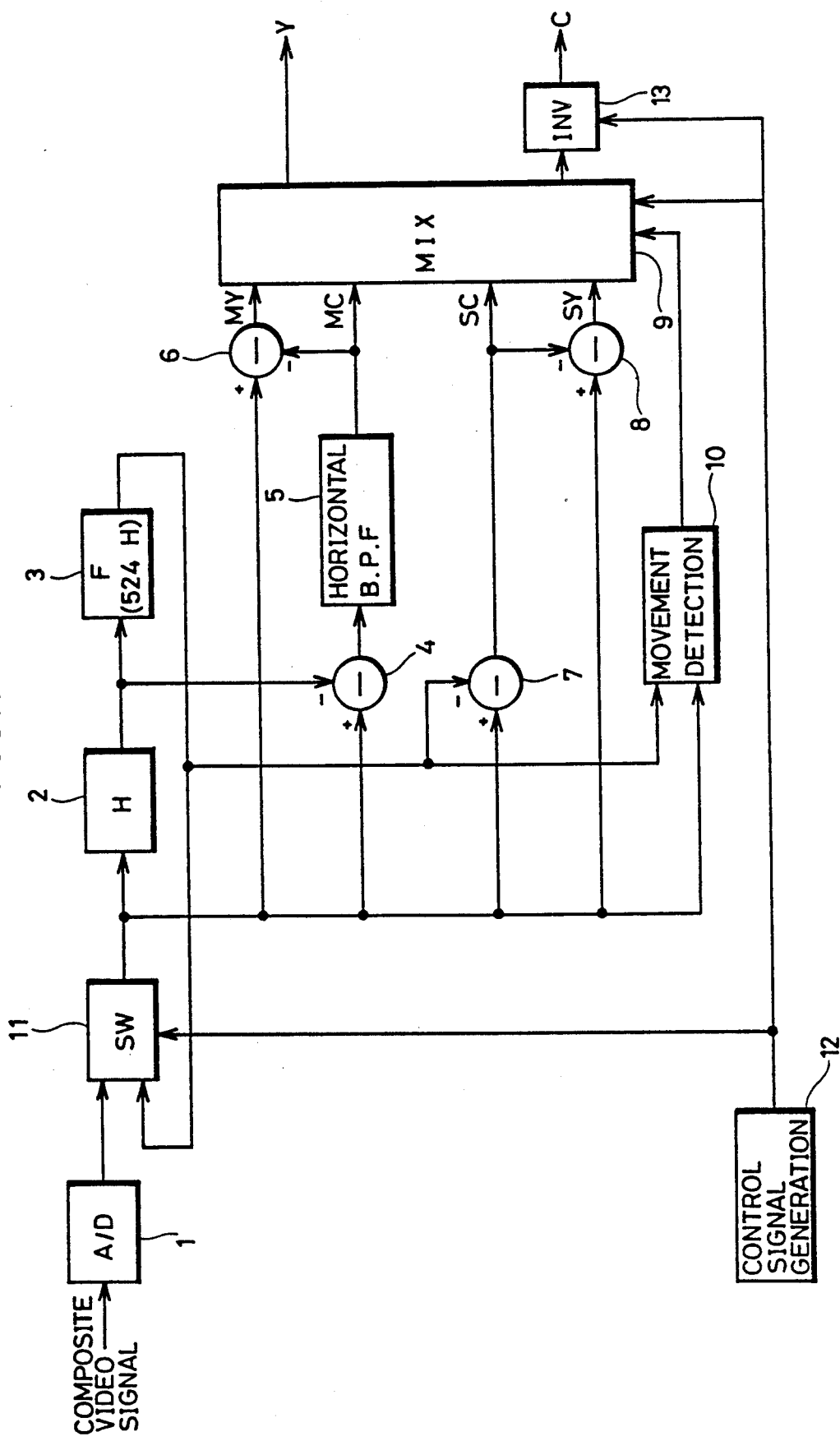
FIG. 2 is a block diagram showing construction of an embodiment of the present invention.

Referring first to FIG. 2, an embodiment of the present invention will be described. The embodiment shown in FIG. 2 has the same construction as that of the conventional movement adaptation type YC separating circuit shown in FIG. 1, except for the below described features. The portions corresponding to those in FIG. 1 are denoted by the same reference numerals and the description thereof is not repeated. The embodiment shown in FIG. 2 further comprises a switch circuit 11, a control signal generating circuit 12 and a chroma inverter circuit 13 in order that the movement adaptation type YC separating circuit may have a still picture reproducing function. The switch circuit 11 selects either an output signal of the A/D converter 1 or an output signal of the frame memory 3 and outputs the selected signal to the line memory 2. The control signal generating circuit 12 generates a control signal in response to an instruction of still picture reproduction from a still picture reproduction switch (not shown) manually operated by the user for example. The control signal is supplied to the switch circuit 11, the mixing circuit 9 and the chroma inverter 13. Switching operation of the switch circuit 11 is controlled in response to the control signal. The mixing circuit 9 is constructed to select and output the first luminance signal MY and the first chrominance signal MC in response to the above mentioned control signal. The chroma inverter circuit 13 is enabled in response to the above mentioned control signal to invert the polarity of the chrominance signal for one frame (525H's) so as to maintain a sequence of a chrominance subcarrier for two frames in still picture reproduction.

Next, operation of the embodiment shown in FIG. 2 will be described.

First, in normal reproduction, the control signal from the control signal generating circuit 12 is at low (L) level and the switch circuit 11 is at the position selecting the output signal of the A/D converter 1. Accordingly, the movement adaptation type YC separating circuit operates in the same manner as in the conventional circuit shown in FIG. 1. In this case, the chroma inverter circuit 13 is disabled and does not operate. Thus, the chroma inverter 13 outputs the chrominance signal C supplied from the mixing circuit 9 as it is.

Next, when the still picture reproduction switch (not shown) is pressed, the control signal from the control signal generating circuit 12 rises to high (H) level. Consequently, the switch circuit 11 is turned to the position for selecting the output signal of the frame memory 3. As a result, the switch circuit 11, the line memory 2 and the frame memory 3 constitute a circulating circuit of one frame (525H's).

Accordingly, the first and second luminance signals MY and SY and the first and second chrominance signals MC and SC supplied to the mixing circuit 9 form a circulation signal of one frame, namely, a still picture signal. Since the two signals inputted to the subtracter 7 are the same, the chrominance signals have the same phase and it is not possible to separate a luminance signal and a chrominance signal in a three-dimensional manner by utilizing frame correlation. Accordingly, it is necessary to separate a luminance signal and a chrominance signal in a two-dimensional manner by utilizing only line correlation in a field in still picture reproduction. Therefore, according to this embodiment, when the control signal from the control signal generating circuit 12 attains H level, the mixing circuit 9 selects and outputs only the first luminance signal MY and the first chrominance signal MC obtained by the forced two-dimensional processing, independent of the output of the movement detecting circuit 10.

As to the chrominance signal selected by the mixing circuit 9, the phase sequence for two frames could not be maintained without any processing. However, the chroma inverter circuit 13 is enabled in response to the control signal of H level, whereby the phase of the chrominance signal is inverted for each frame by the chroma inverter circuit 13. As a result, the sequence of the chrominance signal for two frames can be maintained and a continuous chrominance subcarrier can be obtained.

The timing of switching between L level and H level of the control signal from the control signal generating circuit 12 is selected to be coincident with a vertical blanking period. Accordingly, the timing of switching of the switch circuit 11, namely, the timing of generation of discontinuous points of the phases of the chrominance subcarrier coincides with the timing of inversion of the phase by the chroma inverter circuit 13 and thus a perfect continuity of the chrominance signal can be maintained.

In the above described embodiment, a circulating circuit of one frame (525H's) is formed in still picture reproduction; however, if a circulating circuit of two frames (1050H's) is formed by additionally providing another frame memory, a luminance signal and a chrominance signal can be separated in a three-dimensional manner in still picture reproduction. In such a case, a still picture of a higher quality can be obtained because there are no problems such as cross color or dot interference in a two-dimensional separation. Further, in such a case, the chroma inverter circuit 13 needs not be provided since a sequence of the chrominance subcarrier of the two-frame period can be always maintained. Next, another embodiment for still picture reproduction by using a composite video signal obtained from a circulating circuit of two frames will be described.

Figure 3:
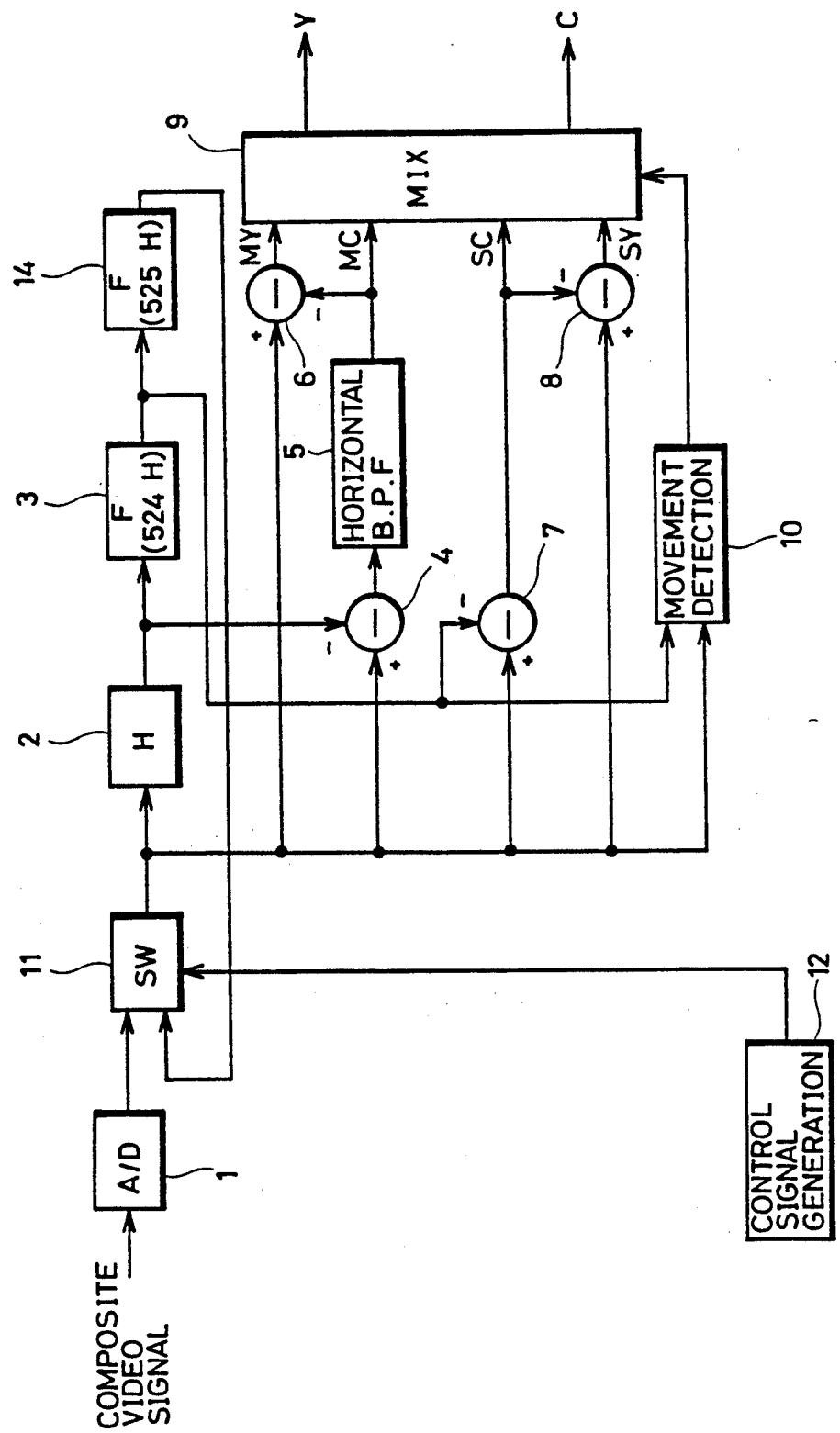
FIG. 3 is a block diagram showing a construction of another embodiment of the present invention.

In the embodiment shown in FIG. 3, a frame memory 14 is additionally provided between the frame memory 3 and the switch circuit 11. This frame memory 14 is constructed to delay an input signal by a one-frame period (525H's). The other construction is the same as that of the embodiment shown in FIG. 2 and the corresponding portions are denoted by the same reference numerals. According to the embodiment shown in FIG. 3, a circulating circuit of two frames is formed by the switch circuit 11, the line memory 2, the frame memory 3 and the frame memory 14 in still picture reproduction. Accordingly, the two composite video signals inputted to the subtracter 7 in still picture reproduction have timings different from each other by one frame and consequently a chrominance signal can be separated by frame correlation. Similarly, a luminance signal can be separated in the subtracter 8. Thus, in the embodiment shown in FIG. 3, it is possible to separate a luminance signal and a chrominance signal two-dimensionally by utilizing line correlation and to separate a luminance signal and a color signal three-dimensionally by utilizing frame correlation. Accordingly, even in still picture reproduction, the mixing circuit 9 is controlled by the output of the movement detecting circuit 10. More specifically, in still picture reproduction, the mixing circuit 9 selects and outputs the first luminance signal MY and the first chrominance signal MC if there is a movement in the composite video signals of two frames circulating in the above mentioned circulating circuit, and it selects and outputs the second luminance signal SY and the second chrominance signal SC if there is no movement in the composite video signals. As a result, in the embodiment shown in FIG. 3, the control signal from the control signal generating circuit 12 is not applied to the mixing circuit 9.

Next, still another embodiment for forming a circulating circuit of two frames in still picture reproduction will be described with reference to FIG. 4. In the embodiment shown in FIG. 4, the output signal of the switch circuit 11 is delayed by a one-frame period (525H's) in the frame memory 15 and then delayed by 1H in the line memory 16, and further delayed by 524H's in the frame memory 17. The output signal of the frame memory 17 is applied to the switch circuit 11 together with the output signal of the A/D converter 1. The subtracter 4 separates a chrominance signal by the input/output signals of the line memory 16. The subtracter 6 subtracts the output signal of the horizontal bandpass filter 5 from the output signal of the frame memory 15, so as to separate a luminance signal. The output signal of the switch circuit 11, the output signal of the frame memory 15 and the output signal of the frame memory 17 are supplied to coefficient multipliers 18, 19 and 20, respectively. The coefficient multipliers 18 and 20 multiply the respective input signals by $-\frac{1}{4}$ and the coefficient multiplier 19 multiplies the input signal by $\frac{1}{2}$. The output signals of those coefficient multipliers 18, 19 and 20 are supplied to an adder 21, where those signals are added. The frame memory 15, the line memory 16, the frame memory 17, the coefficient multipliers 18 to 20 and the adder 21 constitute a three-dimensional comb filter, which separates the second chrominance signal SC. The subtracter 8 subtracts the second chrominance signal SC from the output signal of the frame memory 15, thereby obtaining the second luminance signal SY. The other construction is the same as that of the embodiment shown in FIG. 2. In the embodiment shown in FIG. 4, a circulating circuit of two frames is formed by the switch circuit 11, the frame memory 15, the line memory 16 and the frame memory 17 in still picture reproduction. In still picture reproduction, a luminance signal and a chrominance signal is two-dimensionally separated and three-dimensionally separated from the composite video signal obtained from the circulating circuit. Consequently, in the embodiment of FIG. 4, similarly to the embodiment of FIG. 3, the mixing circuit 9 in still picture reproduction is controlled by the detection signal from the movement detecting circuit 10 so as to select and output either the first luminance signal MY, the first chrominance signal MC or the second luminance signal SY, the second chrominance signal SC.

Figure 4:
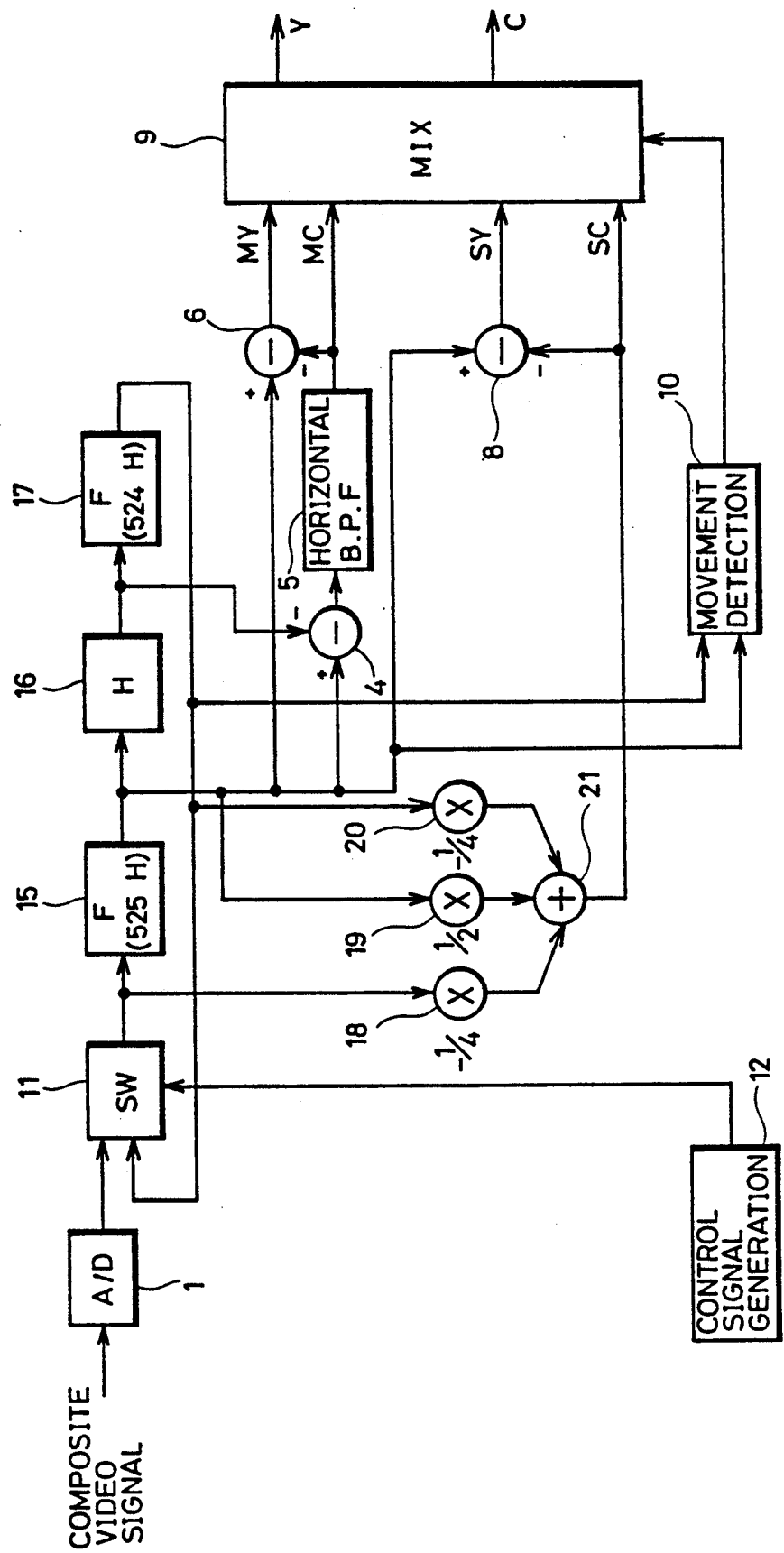
FIG. 4 is a block diagram showing a construction of a further embodiment of the present invention.

According to the embodiment shown in FIG. 3 or FIG. 4, a luminance signal and a chrominance signal can be separated three-dimensionally by utilizing frame correlation even in still picture reproduction as described above and consequently a still picture of high quality can be obtained without any adverse effect such as cross color or dot interference. In addition, the chroma inverter circuit 13 used in the embodiment of FIG. 2 needs not be provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A television receiver having a still picture reproducing function, comprising:
   luminance signal/chrominance signal separating means for separating a luminance signal and a chrominance signal from a composite video signal, said luminance signal/chrominance signal separating means including
   delay means (2, 3, 14, 15, 16, 17) having a plurality of delay elements connected in series for delaying said composite video signal successively through 10, the respective delay elements, thereby outputting a plurality of composite video signals having different prescribed delay times,
   first extracting means (4, 6) for evaluating an input signal and/or an output signal of said delay means and extracting a first luminance signal and a first chrominance signal based on line correlation of the composite video signal, second extracting means (7, 8, 18, 19, 20, 21) for evaluating an input signal and/or an output signal of said delay means and extracting a second luminance signal and a second chrominance signal based on frame correlation of the composite video signal, a movement detecting circuit (10) for detecting a movement of a picture, and a mixing circuit (9) in which a mixing ratio of said first and second luminance signals and the mixing ratio of said first and second chrominance signals are controlled in response to an output of said movement detecting circuit;

control signal generating means (12) for generating a control signal in response to an instruction of still picture reproduction; and switch means (11) controlled in response to said control signal for short-circuiting input and output terminals of said delay means in still picture reproduction, thereby forming a circulating circuit in which said composite signal circulates in said delay means, said luminance signal/chrominance signal separating means separating the luminance signal and the chrominance signal based on an output obtained from said circulating circuit in still picture reproduction.

2. A television receiver in accordance with claim 1, wherein said delay means has a delay time in total selected to be coincident with a one-frame period of the composite video signal, and said mixing circuit in still picture reproduction is controlled by said control signal to select and output only said first luminance signal and said first chrominance signal.

3. A television receiver in accordance with claim 2, further comprising:

a chroma inverter circuit (13) controlled by said control signal for inverting the polarity of the chrominance signal outputted from said mixing circuit for one frame in still picture reproduction.

4. A television receiver in accordance with claim 3, wherein switching operation of said switch means and inverting operation of said chroma inverter circuit are carried out in a vertical blanking period of said composite video signal.

5. A television receiver in accordance with claim 1, wherein said delay means has a delay time in total which is selected to be n times (n being an integer of 2 or more) as long as a one-frame period of the composite video signal.

6. A television receiver in accordance with claim 5, wherein said mixing circuit in still picture reproduction selects and outputs either one of said first and second luminance signals and either one of said first and second chrominance signals in response to the output of said movement detecting circuit.

* * * * *